United States Patent [19]

Takata et al.

[11] Patent Number: 5,796,185
[45] Date of Patent: Aug. 18, 1998

[54] CIRCUIT CARD PRESENT SENSE AND PROTECTIVE POWER SUPPLY INHIBIT FOR AIRBORNE APPLICATION OF ATM SWITCH UNIT

[75] Inventors: Kazuo Takata, Placentia; James Bruce Whitehouse, Brea; Bruce Robert Ferguson, Anaheim, all of Calif.

[73] Assignees: Sony Corporation, Tokyo, Japan; Sony Trans Com Inc., Irvine, Calif.

[21] Appl. No.: 732,526

[22] Filed: Oct. 15, 1996

[51] Int. Cl.[6] .................................................. G06F 13/00
[52] U.S. Cl. ........................... 307/140; 307/139; 395/282; 395/283; 361/737; 323/908
[58] Field of Search .................................. 307/140, 139; 235/492, 494; 395/282, 283; 361/737; 323/908

[56] References Cited

U.S. PATENT DOCUMENTS

| | | |
|---|---|---|
| 3,795,771 | 3/1974 | Gundersen et al. . |
| 4,727,244 | 2/1988 | Nakamo et al. ............... 235/492 |
| 4,853,555 | 8/1989 | Wheat . |
| 4,866,515 | 9/1989 | Tagawa et al. . |
| 4,896,209 | 1/1990 | Matsuzaki et al. . |
| 4,897,714 | 1/1990 | Ichise et al. . |
| 5,123,015 | 6/1992 | Brady, Jr. et al. . |
| 5,203,004 | 4/1993 | Bunton et al. ............... 307/140 |
| 5,404,567 | 4/1995 | DePietro et al. . |
| 5,463,261 | 10/1995 | Skarda et al. ............... 395/283 |
| 5,473,499 | 12/1995 | Weir ............................ 323/908 |
| 5,557,541 | 9/1996 | Schulhof et al. . |
| 5,568,484 | 10/1996 | Margis . |
| 5,586,937 | 12/1996 | Menashe . |
| 5,636,347 | 6/1997 | Muchnick et al. ........... 395/283 |

Primary Examiner—William M. Shoop, Jr.
Assistant Examiner—Albert W. Paladini
Attorney, Agent, or Firm—Blakely, Sokoloff, Taylor & Zafman LLP

[57] ABSTRACT

A system on an aircraft that eliminates hot-swapping of circuit boards to prevent damage to the circuit board connector interfaces. The system supplies power to a circuit card only when there is an effective coupling between a circuit card connector and an opposite mating connector. A power control circuit responds to a card present signal which indicates when the circuit card connector is coupled to the opposite mating connector. A logic circuit converts the card present signal to a power supply enable signal. A main power supply receives the power supply enable signal and provides power to the circuit card only when the circuit card connector and the opposite mating connector are appropriately coupled.

16 Claims, 4 Drawing Sheets

5,796,185

1

CIRCUIT CARD PRESENT SENSE AND PROTECTIVE POWER SUPPLY INHIBIT FOR AIRBORNE APPLICATION OF ATM SWITCH UNIT

BACKGROUND OF THE INVENTION

1. Field of the Invention

The present invention relates to protecting ATM circuit in boards in airborne applications by preventing the insertion and removal of circuit board while being simultaneously powered by a power supply.

2. Description of Related Art

Over the last few decades, commercial aircraft have become a necessary mode of travel for personal and business reasons. In order to improve passenger comfort, many commercial airlines now offer on-board telephony as well as in-flight entertainment such as video games, pay-per-view movies, hotel reservations services, and the like. Such amenities require supporting electronics distributed through the aircraft. Maintenance of the sophisticated electronics in in-flight entertainment systems (IES) is a major concern of the airlines.

Quick servicing and maintenance of aircraft is important to the airline industry. The amount of time an aircraft spends on the ground represents lost flying time and lost profits. Diagnostic equipment which hooks up quickly to electronics aboard the aircraft and rapidly identifies problems is an important part of reducing aircraft servicing time. Designs which integrate the diagnostic electronics into the aircraft further reduce aircraft servicing time, thereby increasing aircraft flight time and airline industry profitability.

"Hot swapping", the practice of removing and inserting circuit boards while the circuit card and the unit receiving the circuit card are receiving power or "powered up", is a common practice in the maintenance of asynchronous transfer mode (ATM) switches. "Hot swapping" saves time by allowing service personnel to swap circuit cards without manually switching the system power on and off. Special connectors, usually asymmetric connectors that have different length connector pins make hot swapping possible. In particular a power pin which receives current and a ground pin associated with the power pin must have different lengths to ensure that the ground pin makes contact with a mating ground pin contact before the power pin makes contact with a mating power pin contact.

Special "hot swapping" connectors such as asymmetric connectors, have several disadvantages. A first disadvantage is that a special non-standard mating connector must be used to accommodate hot swapping connectors. For example, in the case of asymmetric connectors, the mating connector which is often mounted on a back plane must have asymmetric contacts to accommodate the different length pins in the asymmetric connector. A second disadvantage of hot swapping connectors is that these connectors usually must be custom made. For example, in asymmetric connectors, each pin length must be specially trimmed to an appropriate length. In particular the ground pin is often very long to assure first contact when the card is rapidly plugged into position. Custom designing asymmetric connectors and the accompanying mating connectors is expensive.

Unique designs which allow "hot swapping" without requiring an asymmetric connector with different length pins have been developed. These systems developed by Fore Systems, Inc., 174 Thorn Hill Road, Warrendale, Pa. 15086-7586, were designed for general "off the shelf" use and do not meet the special needs of Aircraft design. In particular, these systems consume more power and dissipate more heat than can economically be allowed in a commercial aircraft.

Airborne applications of circuit designs, particularly ATM switches, require the tight control of electromagnetic emissions and heat generation. The hot swapping capability of the prior art generates more heat than can be properly dissipated in the tight confines of aircraft electronics. Thus traditional "hot swapping" systems are unsuitable for many airborne applications.

The many limitations of "hot swapping" systems has resulted in the design of airborne systems in which certain "necessary" circuit cards, particularly ATM switch circuit cards, cannot be "hot swapped". However, it is second nature for someone who is familiar with or used to working with traditional circuit cards, particularly ATM switch circuit cards, to attempt to hot swap the circuit cards. This is particularly problematic in aircraft maintenance where time pressures make service personnel particularly prone to "hot swapping" all the circuit cards, including necessary circuit cards. Hot swapping of these, necessary circuit cards without special connectors or merely providing power to these necessary circuit card before all the pins or connectors in a card are coupled can result in significant damage to the necessary circuit card as well as possible damage to the back plane to which the circuit card plugs in. This damage is particularly severe in ATM switching circuit cards for airborne applications where the high currents (50–60 amps) flowing through the connectors will melt connector pins if power is supplied before all connector pins (typically 20 pins) are properly connected.

Thus there exists a need for a system that prevents power from flowing through the system when "necessary" or "non-swappable" cards are missing or improperly connected. In particular, a system is needed which prevents power from flowing to the switches prior to insertion of all necessary circuit cards and for turning power off when a circuit card has been removed and which meets with the stringent requirements of an airborne system.

SUMMARY OF THE INVENTION

The present invention overcomes the limitations imposed on airborne systems by providing a system that inhibits hot-card swapping and meets airborne electromagnetic and heat generation requirements. The system generates a card present signal and supplies power to a circuit card only when the card present signal indicates there is an electrical coupling sufficient to support an anticipated current flow between a connector terminal on the circuit card and an opposite mating connector terminal on a power control circuit. The present invention particularly relates to such a system as used in an airborne ATM switching system.

The power control circuit of the present invention detects when one or more circuit cards are properly coupled to the power control circuit. Detection is accomplished by applying an auxiliary voltage to a contact in the power control circuit connector terminal (PCCCT). The contact couples to sensing pins either in the PCCCT or in the circuit card connector terminal (CCCT). When the CCCT is coupled to the PCCCT, a voltage drop occurs in a contact to a sensing pin (CSP) in the PCCCT. The drop in voltage of the CSP in the PCCCT represents a card present signal which is input to a logic circuit.

The logic circuit in the power control circuit combines the information from the card present signal with other card present signals from other necessary circuit cards, cards without which the system cannot operate. It is contemplated that the logic circuit may be replaced by software or other circuitry capable of processing the card present signals. The power control circuit enables operation of the main power supply such that the power supply provides power only when all circuit cards necessary to the proper operation of the system are already connected. In particular, the control circuit disconnects or disables the main power supply if a necessary circuit card is removed or if a bad connection is detected in a coupling between the power control circuit and a necessary circuit card.

BRIEF DESCRIPTION OF THE DRAWINGS

The advantages of the present invention will become more readily apparent to those ordinarily skilled in the art after reviewing the following detailed description and accompanying drawings, wherein.

DETAILED DESCRIPTION OF THE INVENTION

Figure 1:
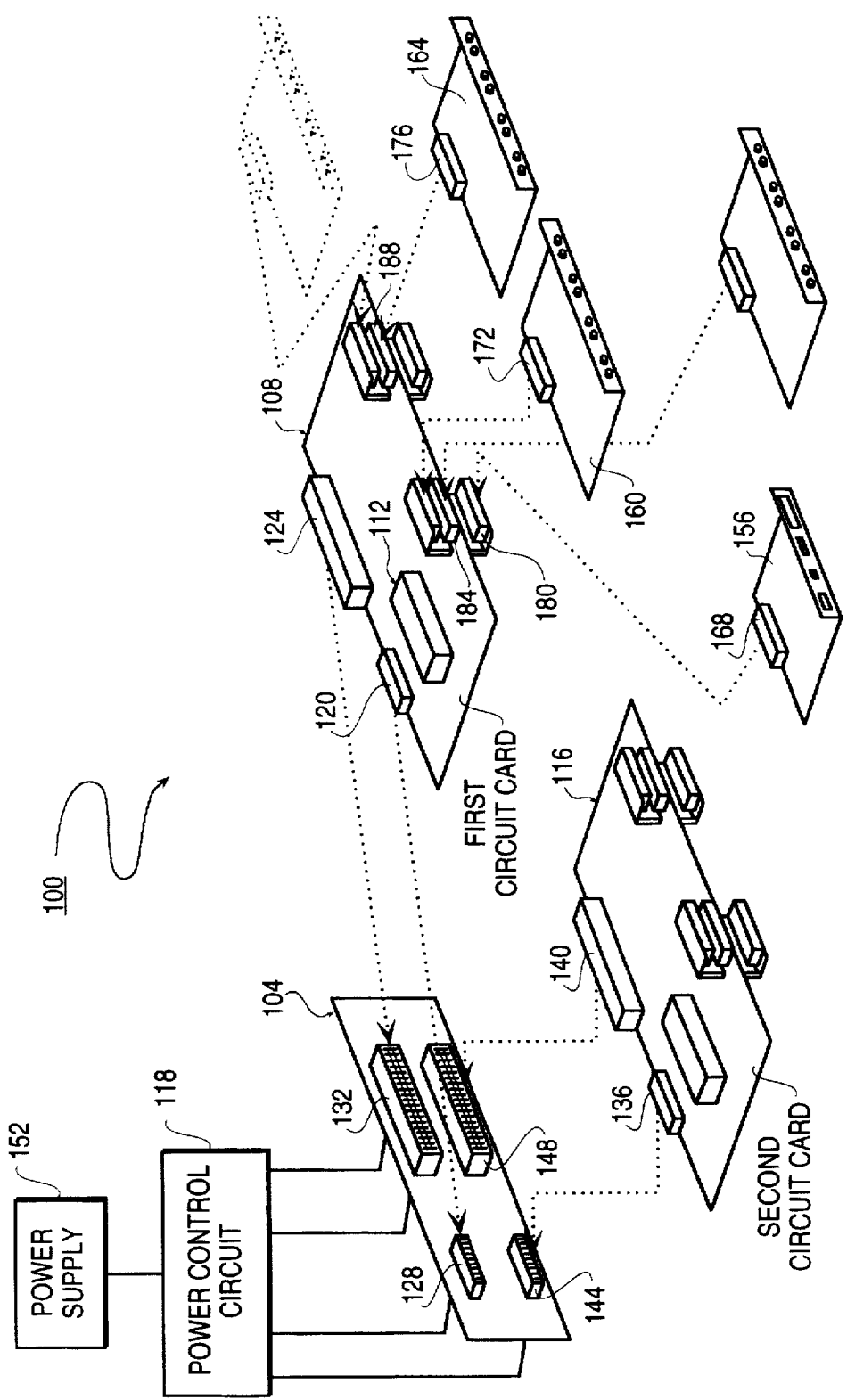
FIG. 1 is an illustration of an ATM switch unit and associated modular interconnections.

FIG. 1 shows an overall asynchronous transfer mode (ATM) switch unit structure and associated modular interconnections utilized in aircraft systems. The ATM electronics 100 includes a back plane 104 and circuit cards 108, 116 which plug into the back plane 104. The circuit cards 108, 116 (also called switch fabrics) includes circuitry for performing various function and may include ATM switches or other signal processing electronics 112. The circuit cards 108, 116, 156, 160, 164 are typically ATM switch cards which draw currents of around 60 amperes. Although, the embodiment shown includes two circuit cards, a first circuit card 108 and a second circuit card 116, the present invention can be modified to accept as many circuit cards or just one circuit card as needed.

A power control circuit 118 detects when first circuit card connector terminals (FCCCT) 120, 124 are coupled with corresponding opposite mating connectors which are first back plane connector terminals (FBPCT) 128, 132. Likewise the circuit also detects when second circuit card connector terminals (SCCCT) 136, 140 are connected to corresponding opposite mating connectors which are second back plane connector terminals (SBPCT) 144, 148. When the FCCCT 120, 124 and the SCCCT 136, 140 are all appropriately connected to the corresponding connectors terminals in the back plane 128, 132, 144, 148, each coupling generates a card present signal. A logic circuit in the power control circuit 118 processes the card present signals and generates a power enable signal indicating that power can now be supplied to the first and second circuit cards 108, 116 without damaging electronics 112 on the circuit cards. The power control circuit 118 continues to monitor the card present signal such that if an attempt is made to remove either the first circuit card 108 or the second circuit card 116, the power control circuit 118 disables the power supply circuit 152 discontinuing power to the first and second circuit cards 108, 116.

The described ATM switch system 100 can be further expanded to include further plug-in cards such as a switch control processor 156 and net modules 160 and 164. These processors or modules 156, 160, 164 each have connectors 168, 172, 176 which plug into corresponding opposite mating connectors on the circuit card 180, 184, and 188. If "hot swapping" of these net modules 160 or 164 would cause damage to either connectors or circuitry then the connector detection circuitry in the power control circuit 118 can be further modified to detect whether the switch control processor 150 or net modules 160 and 164 are properly connected to their respective connections 180, 184, 188.

Figure 2:
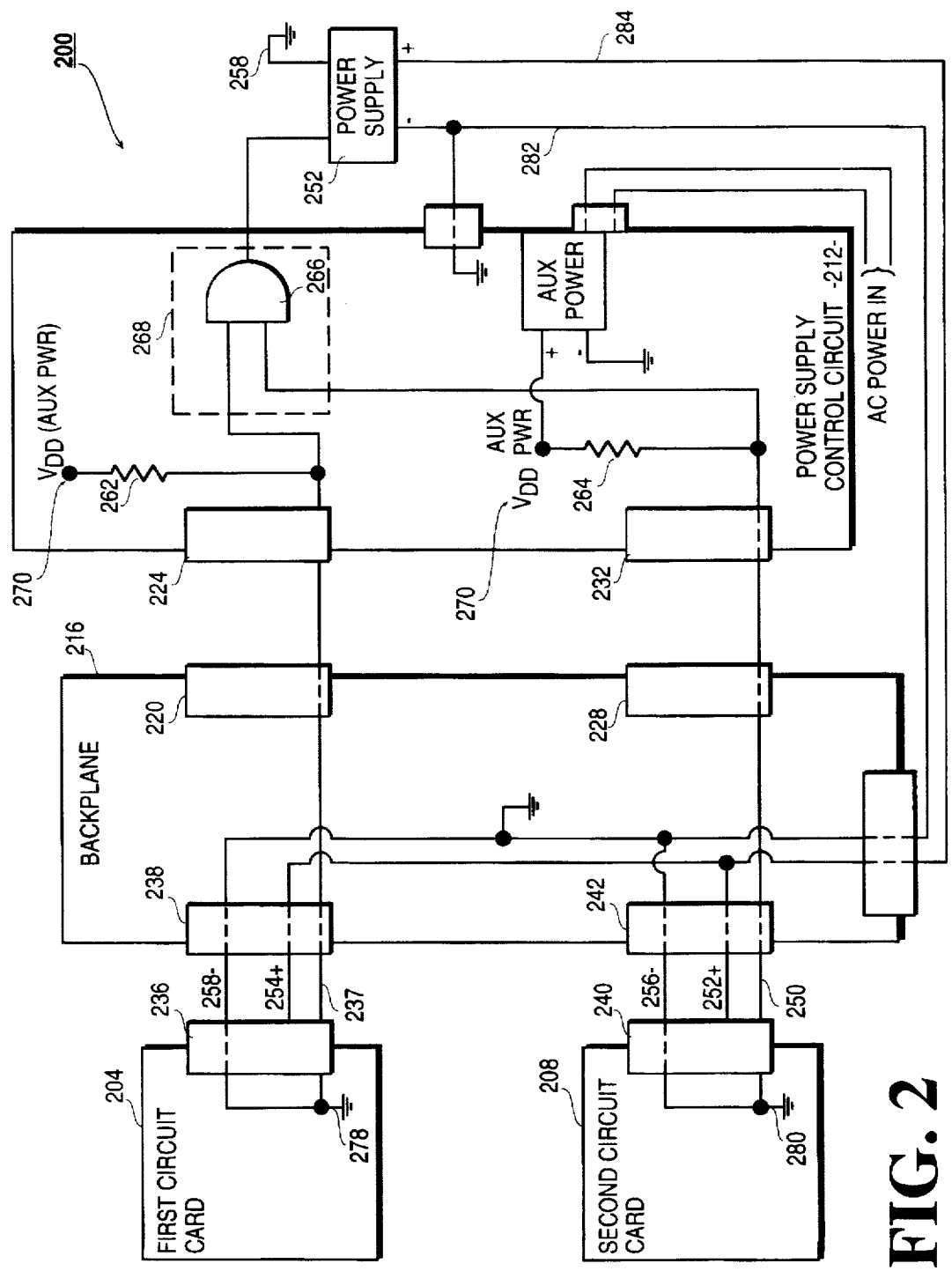
FIG. 2 is a functional block diagram of a system which detects the presence of a circuit card and controls the power supply of the circuit cards based on the power control circuitry.

FIG. 2 is a block diagram schematic 200 of a card present detection system for determining when circuit cards 204 and 208 are connected to a power control circuit 212 and enabling a power supply to supply power to the circuit cards 204, 208 only when the circuit cards are connected. The power control circuit 212 may be a part of a back plane 216. In another embodiment shown in FIG. 2, the back plane and the power control circuit 212 are separate elements which are connected via a cable or via a series of power control circuit connectors (PCCC) 220, 224, 228 and 232. First circuit card 204 is coupled to the back plane 216 via FCCCT 236 which couples to an opposite mating connector in the back plane. FBPCT 238. Sensing pins 237 couples the first circuit card to the back plane. Power supply return, 258, completes the circuit and pulls down the sensing pin 237 to a low logic level. The contact to the sensing pins (CSP) couples the sensing pin 237 to the power control circuit 212. The sensing pin 237 may be a part of either the circuit card connector terminal or the sensing pin 237 may be part of an opposite mating connector terminal, such as the FBPCT. In either case, a voltage in the CSP which couples the sensing pin 237 to an input of the power control circuit 212 is used to monitor whether the circuit card is present. The CSP voltage is a first card present signal.

A second circuit card 208 is coupled to the back plane 216 via the SCCCT connector 240 which couples to an opposite mating connector SBPCT 242. The connection is monitored by generating a second card present signal at the CSP of sensing pin 250. The power control circuit 212 generates an output based on the first and second card present signals and transmits the output to a power supply 252 which provides power to the first and second circuit cards 204 and 208. Power is provided using a power connection through power pins 252, 254. The power supply circuit loop is closed via ground pins 256 and 258 which connect the first and second circuit cards 204 and 208 to the ground 282 of the power supply 252.

Power control circuit 212 includes a power detection circuit 216 which includes two pull-up resistors 262 and 264 that couple the inputs of logic circuit 268 to an auxiliary power supply 270. In one embodiment, the pull-up resistors 262, 264 are 1K ohm resistors which connect the inputs of NAND gate 266 to an auxiliary power supply of 5 volts.

In the embodiment shown in FIG. 2, the circuit cards 204, 208 do not couple directly to the power control circuit. Instead the circuit cards couple to a back plane 216 which couples to the power control circuit 212. The back plane 216 serves as an intermediate circuit element which requires a second set of connections 220, 224, 228, 232 to couple the back plane 216 and the power control circuit 212.

The card present detection system also detects when intermediate circuit elements such as back plane 216 are properly coupled. When back plane 216 is not coupled to the power control circuit 212, the inputs to logic circuit 268 are ungrounded and thus are at a potential set by $V_{DD}$ (5 volts). Coupling back plane 216 to power control circuitry 212 provides an electrical coupling from the auxiliary power supply 268 to the sensing pins 237 and 250 in FBPCT 238 and SBPCT 242.

Although the pictured embodiment only displays one intermediate circuit element, the back plane 216, between the circuit cards 204, 208 and the power control circuit 212, it is contemplated that multiple elements may be connected between the power control circuit and the final grounding element 278, 280. For example, if the modular interconnect 160, 164 of FIG. 1 were necessary to operation of the circuit, the connections to ground would be included in the modular interconnects. In this configuration, the intermediate circuit elements include the back plane 104, and the first circuit card 108. These intermediate elements convey the signal from a CSP in the power control circuit to the final grounding element. Such a system ensures not only that the grounding circuit card is coupled, but that intermediate circuit elements such as a first circuit card and a back plane are also connected.

In FIG. 2, first circuit card 204 and second circuit card 208 are the final grounding elements and are the necessary circuit cards. Sensing pins 237, and 250 connect the CSP to grounds 278, 280 in the respective circuit cards. The sense pin and ground pin are positioned at opposite ends of the connector to assure that multiple pins of a coupling connector pair are in contact prior to the application of power to the connector. This prevents high current power from being supplied when only a few pins in a coupling connector pair are in contact. In an alternate embodiment, multiple sense pins in a single connector may be used to assure adequate connector coupling. A high current supplied to a few pins can result in damage to the connector pins or connector body due to excessive localized heat dissipation.

After the first and second circuit cards 204, 208 are coupled to back plane 216 the inputs to logic gate 266 are grounded or unasserted. Thus unasserted card present signals indicate that the first and second circuit cards are properly coupled to the back plane 216 and that the back plane 216 is properly coupled to the power control circuit 212.

Logic circuit 266 which may include one or more logic gates 266, processes the card present signals and outputs an enable signal for a power supply 252. If both the first and second circuit cards 204, 208 are properly connected, power supply 252 will be enabled. The power supply provides power to the circuit cards 204, 208.

Figure 3:
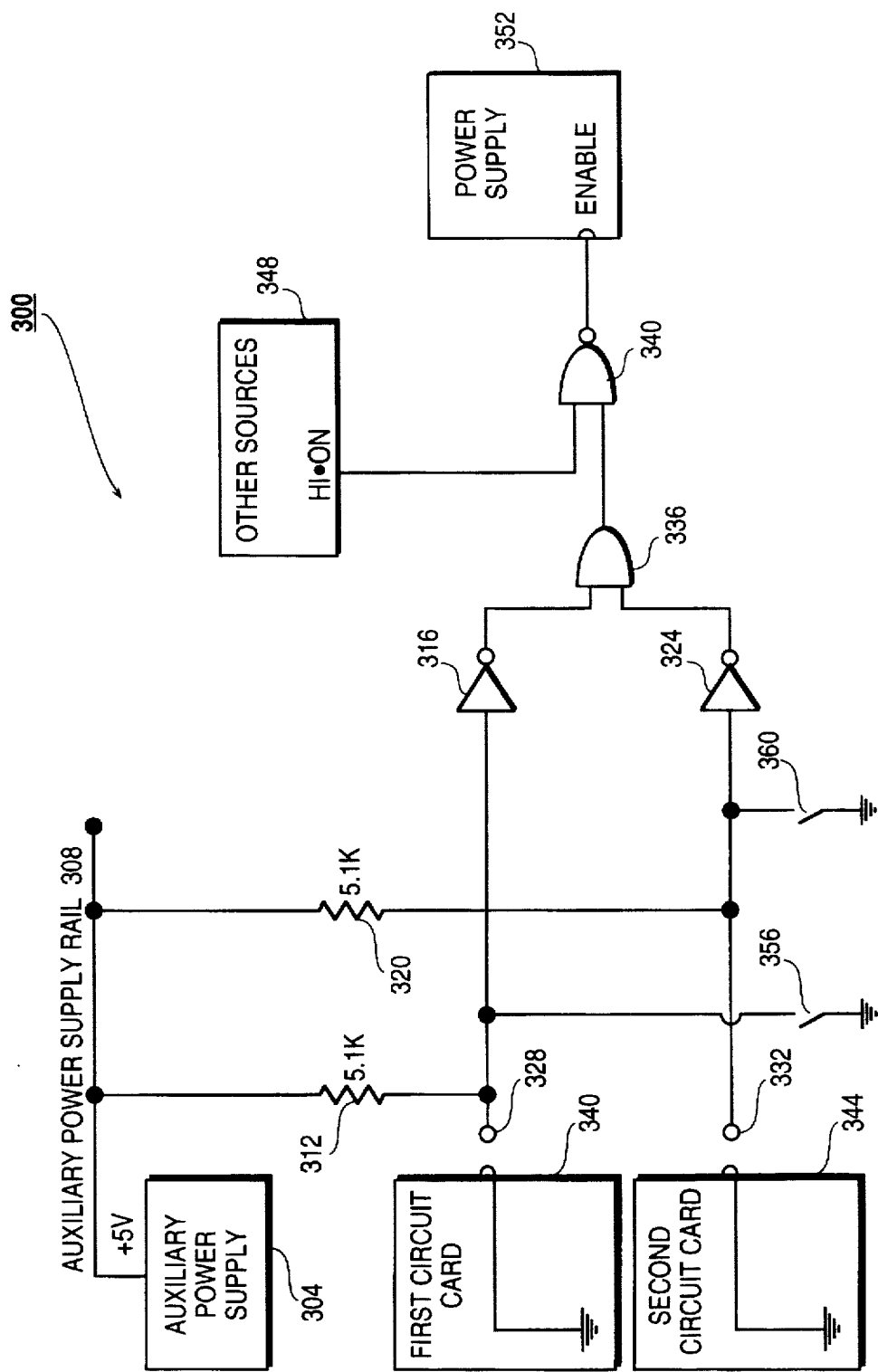
FIG. 3 is a circuit schematic showing one embodiment of the connection sensing circuitry.

FIG. 3 is a circuit schematic of a second embodiment of the connection detection circuit 268 in the power control circuitry 118.

The power control circuit 300 includes a 5 volt auxiliary power supply 304 which distributes power via power rail 308. A pull-up resistor 312 connects the power rail 308 to an inverter gate 316 input. A second pull-up resistor 320 connects power rail 308 to the input of a second inverter gate 324. The inputs to inverter gates 316 and 324 are connected to CSP 328 and 332, respectively. These CSPs are designed to either directly or indirectly couple to circuit cards. When a circuit card is not coupled to a CSP, 328, 332, the CSP represents an open circuit and the potential at the CSP is approximately the potential at the power rail 308.

The output of the inverter gates 316, 324 are coupled to the inputs of an AND gate 336. The output of AND gate 336 is coupled to the input of a circuit NAND gate 340. The output of the NAND gate 340 is coupled to an input or enable of a power supply circuit 352.

When circuit cards are not present or connected to CSPs 328 or 332, only a small current will flow through pull-up resistors 312 and 320. Thus, the potential drop across 312 and 320 is small and the inputs to the inverter gates 316 and 324 will be asserted or high. Inverter gates 316 and 324 invert the input signals and outputs deasserted signals which are transmitted to the AND gate 336. Since both input signals to AND gate 336 are deasserted, AND gate 336 outputs a deasserted signal.

NAND gate 340 receives the deasserted signal from AND gate 336. Since at least one input of NAND gate 340 is a deasserted signal, NAND gate 340 will automatically output an asserted signal, regardless of other inputs that may come in from other sources 348. The asserted output of NAND gate 340 is input into an enable of a power supply 352 and disables the power supply. The power supply may be any logically enabled power source such as an Astec AM80A-300L-050F40 power converter module.

Assuming that all necessary circuit cards 340, 344 are connected to a respective CSP 328 and 332, the circuit cards will ground CSPs 328, 332. In particular, circuit card 340 connects CSP 328 to ground and circuit card 344 connects CSP 332 to ground. The grounding of CSPs 328, 332 results in a deasserted input being applied to the input of inverter gates 316 and 324. Thus inverter gates 316 and 324 provide an asserted signal to AND gate 336. Since both inputs to AND gate 336 are asserted, AND gate 336 outputs an asserted signal indicating an "ON" state. NAND gate 340 receives the asserted output of AND gate 336 along with output from other sources 348. If all inputs to NAND gate 340 are asserted a deasserted power supply enable signal is output. This deasserted signal is applied to the enable of power supply 352 enabling power supply 352 to provide power to the circuit cards.

If at least one necessary circuit card 330, 344 is not coupled to an appropriate CSP 328, 332, then the inputs to at least one inverter 316, 324 will be high or asserted, and thus at least one of the inputs to AND gate 336 will be deasserted. At least one deasserted input to AND gate 336 results in a deasserted output of AND gate 336. The output of AND gate 336 is applied to the input NAND gate 340 and results in an asserted signal being output by NAND 340 for the power enable signal. An asserted power enable signal results in no power being provided to the circuit cards by power supply circuit 352.

Switches 356 and 360 are optional and can be used to connect the inputs of inverter 316 and 324 to ground. These switches 356, 360 when closed disable the corresponding CSP input. A two card CSP system can thus be configured to sense the presence of only one circuit card by closing one switch corresponding to an unnecessary circuit card. Such a feature is useful when an ATM switch services only a small number of nodes.

Figure 4:
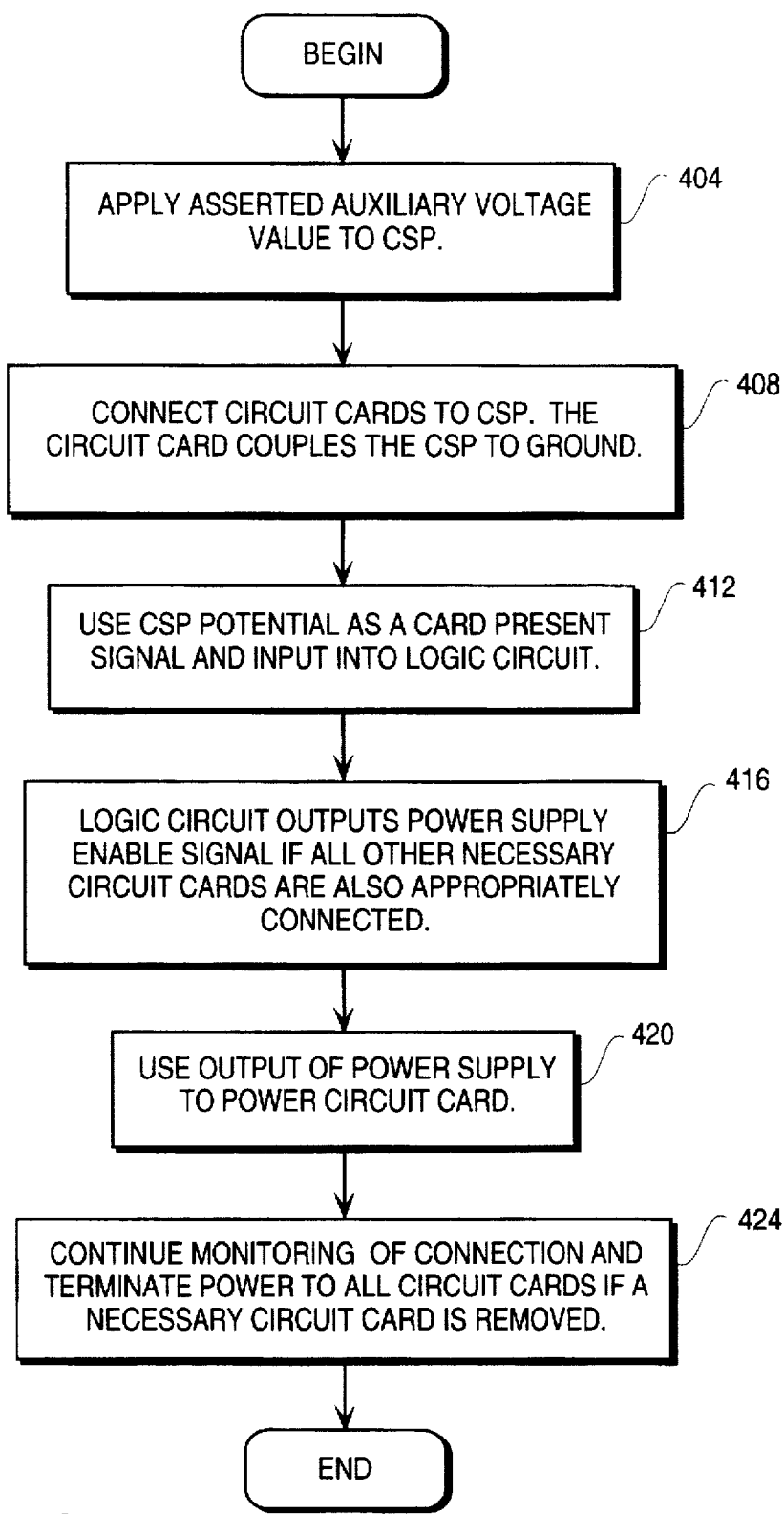
FIG. 4 is a flow chart diagram of the operation of the card present detection electronics of the power control circuit.

FIG. 4 is a flow chart diagram of the operation of the circuit card present sense circuit. In step 404, an auxiliary voltage is applied to a CSP which provides the input to a logic circuit in a card detection circuit. This asserted voltage value remains until a circuit card, is coupled to the CSP step 408. The potential of the CSP is used as a card present signal and input into a logic circuit step 412. The circuit card, via a sense pin connection, grounds or deasserts the CSP. Thus when a circuit card is coupled to the CSP, the logic circuit inputs are deasserted.

If all the card present signals from the necessary circuit cards indicate proper connections, the logic circuit in the card detection circuit outputs a power supply enable signal which enables the power supply step 416. Once enabled, the power supply provides power to circuit cards step 420.

The power control circuit continues monitoring the coupling between the circuit cards and the power control circuitry. If a necessary circuit card is removed, or if a subsequent bad connection forms, the power control circuit disables the power supply to prevent damage to the circuit and the connecting pins step 424.

Although the preceding detailed description has described Applicant's invention in the context of an in-flight entertainment system which detects the presence of a circuit card, other embodiments of Applicant's invention are contemplated. For example, Applicant's invention may be used to detect the termination of other circuit cards in an aircraft. Applicant's invention is also applicable to the detection of the presence of circuit cards, especially ATM switching cards, in other transportation vehicles such as busses, trains, and ships. These transportation vehicles also benefit from quick maintenance and servicing.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed:

1. A system for delivering power to a circuit card when the circuit card is coupled to a power control circuit, said system comprising:

a circuit card connector terminal mounted on said circuit card;

an opposite mating connector terminal located in an aircraft passenger in-flight entertainment system corresponding to said circuit card connector terminal, said opposite mating connector terminal coupled to said power control circuit, said power control circuit configured to detect whether said circuit card connector terminal is coupled to said opposite mating connector and to generate a first card present signal;

a logic circuit in said power control circuit which generates a power supply enable signal based on the first card present signal; and, a main power supply which provides power to said circuit card, said main power supply configured to receive the power supply enable signal from said power control circuit and to provide power to said circuit card only when the power supply enable indicates that the circuit card connector terminal is coupled to said opposite mating connector.

2. The system of claim 1, said power control circuit further comprising an auxiliary power source coupled to said opposite mating connector terminal, said auxiliary power source providing an asserted state to the input of a logic circuit when said opposite mating connector is decoupled from said input circuit card connector terminal.

3. The system of claim 2 wherein said circuit card connector terminal includes a connection to ground such that a deasserted ground level state is provided to the input of said logic circuit when said opposite mating connector is coupled to said circuit card connector terminal.

4. The system of claim 3 wherein the output of said logic circuit is coupled to an enable of said main power supply.

5. The system of claim 1, wherein said system further comprises:

a second circuit card connector terminal mounted on a second circuit card;

a second opposite mating connector corresponding to said second circuit card connector terminal, said second opposite mating connector coupled to said power control circuitry, said power control circuitry configured to detect whether said second circuit card connector terminal is coupled to said second opposite mating connector and to generate a second card present signal;

a logic circuit which receives the first and second card present signals and outputs a power supply enable signal enabling said main power supply only when both the first circuit card connector terminal is coupled to said opposite mating connector and said second circuit card connector terminal is connected to said second opposite mating connector.

6. A system for delivering power to a circuit card only when the circuit is coupled to a power control circuit, said system comprising:

a circuit card connector terminal mounted on said circuit card;

an opposite mating connector terminal corresponding to said circuit card connector terminal, said opposite mating connector terminal coupled to said power control circuit, said power control circuit configured to detect whether said circuit card connector terminal is coupled to said opposite mating connector and to generate a first card present signal;

a logic circuit in said power control circuit which generates a power supply enable signal based on the first card present signal; and, a main power supply which provides power to said circuit card, said main power supply configured to receive the power supply enable signal from said power control circuit and to provide power to said circuit card only when the power supply enable indicates that the circuit card connector terminal is coupled to said opposite mating connector.

7. The system of claim 6, said power control circuit further comprising an auxiliary power source coupled to said opposite mating connector terminal, said auxiliary power source providing an asserted state to the input of a logic circuit when said opposite mating connector is decoupled from said input circuit card connector terminal.

8. The system of claim 7 wherein said circuit card connector terminal includes a connection to ground such that a deasserted ground level state is provided to the input of said logic circuit when said opposite mating connector is coupled to said circuit card connector terminal.

9. The system of claim 6 further comprising a back plane circuit, said back plane circuit electrically coupling said power control circuit to said opposite mating connector.

10. The system of claim 6, wherein said system further comprises:

a second circuit card connector terminal mounted on a second circuit card;

a second opposite mating connector corresponding to said second circuit card connector terminal, said second opposite mating connector coupled to said power control circuitry, said power control circuitry configured to detect whether said second circuit card connector terminal is coupled to said second opposite mating connector and to generate a second card present signal;

a logic circuit which receives the first and second card present signals and outputs a power supply enable signal enabling said main power supply only when both the first circuit card connector terminal is coupled to said opposite mating connector and said second circuit card connector terminal is connected to said second opposite mating connector.

11. A method of providing power to a circuit card only when the circuit card is properly coupled to a power supply control circuit, said method comprising the steps of:

generating a card present signal at a contact to a sense pin in a mating connector, said card present signal indicates whether a circuit card connector terminal is coupled to said mating connector;

transmitting the card present signal to a logic circuit in said power supply control circuit which generates a power enable signal;

supplying power from a power supply when the power enable signal from said logic circuit indicates the circuit card connector is electrically connected to the output connector and disabling the power supply when said logic circuit indicates the circuit card connector is not electrically connected to the output connector.

12. The method of claim 11 further comprising the steps of:

providing auxiliary power to the input connector such that the contact to the sense pin in the mating connector is in an asserted state;

coupling the contact to the sense in the mating connector to a ground connection in the circuit card when the circuit card is electrically connected such that the contact to the sense pin in the mating connector is grounded and thus in a deasserted state;

using the potential of the contact to the sense pin in the mating connector as an input to the logic circuit generating the power supply enable signal.

13. The method of claim 11 further comprising the steps of transmitting a second card present signal from a second contact to a second sense pin in said mating connector, said logic circuit enabling said power supply only if both contacts to both sense pins indicate a proper connection between the mating connector and the circuit card connector.

14. The method of claim 11 further comprising the steps of transmitting a second card present signal from a second sense pin in a second mating connector, said logic circuit enabling said power supply only if both contacts to both sense pins indicate an electrical connection between said mating connector and said circuit card connector and between said second mating connector and a second circuit card connector.

15. The method of claim 14 further comprising the step of transmitting a third card present signal from a third contact to a third sense pin in a second mating connector, said logic circuit enabling said power supply only if all three card present signals indicate an electrical connection.

16. A system for determining when to provide power to a circuit card in a transportation vehicle ATM switching system comprising:

a circuit card connector coupled to the circuit card, said circuit card connector including a contact which connects a sense pin directly to ground;

a power control circuit including a control circuit connector having a contact to said sense pin, said sense pin coupling said power control circuit connector to said circuit card connector;

an auxiliary power supply providing a voltage to said contact to a sense pin;

a logic circuit which monitors said contact to a sense pin to determine whether said circuit card is coupled to said power control circuit; and, a power supply providing power to the transportation vehicle ATM switching system, the power supply configured to receive the output of said logic circuit and to provide power to said circuit card only when said circuit card is coupled to said power control circuit.

* * * * *

UNITED STATES PATENT AND TRADEMARK OFFICE
CERTIFICATE OF CORRECTION

PATENT NO. : 5,796,185
DATED : August 18, 1998
INVENTOR(S) : Takata et al.

It is certified that error appears in the above-identified patent and that said Letters Patent is hereby corrected as shown below:

In column 2 at line 22 delete "these, necessary" and insert --these necessary--

Signed and Sealed this

Third Day of April, 2001

Attest:

Attesting Officer

NICHOLAS P. GODICI

*Acting Director of the United States Patent and Trademark Office*